US012719700B2

(12) United States Patent
Singh et al.

(10) Patent No.: US 12,719,700 B2
(45) Date of Patent: Aug. 25, 2026

(54) DYNAMIC CONFIGURATION FOR DATA TRANSFER TERMINALS

(71) Applicant: Apple Inc., Cupertino, CA (US)

(72) Inventors: Rahul Narayan Singh, Santa Clara, CA (US); Robin Burel, Santa Clara, CA (US); Vincent Pozzuoli, Montreal (CA); Catalin Giurca, Santa Clara, CA (US); Mamta Devi, Montreal (CA); Marawan Ragab, Laval (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/771,397

(22) Filed: Jul. 12, 2024

(65) Prior Publication Data

US 2026/0019279 A1 Jan. 15, 2026

(51) Int. Cl.
*H04L 9/32* (2006.01)

(52) U.S. Cl.
CPC .................................. *H04L 9/3263* (2013.01)

(58) Field of Classification Search
None
See application file for complete search history.

(56) References Cited

U.S. PATENT DOCUMENTS 8,856,527 B1 10/2014 Schwengler et al.
11,461,451 B2 10/2022 Chen et al.
2019/0313241 A1 10/2019 Ahmed et al.
2020/0351373 A1 11/2020 Gupta et al.
2020/0374686 A1 11/2020 Zhang et al.
2022/0147974 A1* 5/2022 Law ........................ G06F 21/34
2024/0113898 A1* 4/2024 Er ......................... G06F 21/552

FOREIGN PATENT DOCUMENTS

CA 2785430 A1 7/2011
CN 103491097 A 1/2014

OTHER PUBLICATIONS

International Search Report and Written Opinion issued in PCT Application No. PCT/US2024/037671, dated Oct. 9, 2024 in 25 pages.

(Continued)

*Primary Examiner* — Brandon Hoffman
(74) *Attorney, Agent, or Firm* — Kilpatrick Townsend & Stockton LLP

(57) ABSTRACT

A method may include receiving configuration data associated with an application used for secure data transfers. The method may include accessing certificate data indicating a certificate chain from a certificate service. The method may include generating a configuration script based at least in part on the configuration data and including at least a portion of the certificate data in the certificate data. The method may include generating a script hash based on at least a portion of the configuration script. The method may include receiving a validation signature for the configuration script from the certificate service. The method may include providing the configuration script, the script hash, and the validation signature to a user device may include the application used for secure data transfers such that the application is modified using the configuration script.

19 Claims, 7 Drawing Sheets

(56) References Cited

OTHER PUBLICATIONS

Non-Final Office Action issued in U.S. Appl. No. 18/353,802, dated Apr. 10, 2025 in 15 pages.
Final Office Action issued in U.S. Appl. No. 18/353,802, dated Dec. 30, 2025 in 18 pages.
International Preliminary Report on Patentability issued in PCT Application No. PCT/US2024/037671, dated Jan. 29, 2026 in 10 pages.

* cited by examiner

FIG. 2B

DYNAMIC CONFIGURATION FOR DATA TRANSFER TERMINALS

BACKGROUND

Configuring applications to perform secure data transfers require that all entities involved are secure and trusted. Current methods of configuring the applications may be performed within a security domain, where access is restricted to only trusted parties. Because access to the security domain may be limited, configuring and/or modifying these applications may be difficult to perform, potentially leading to risk of exposure. Thus, more efficient means of updating applications are needed.

BRIEF SUMMARY

A method may include receiving, by a configuration generator of a computing system, configuration data associated with an application used for secure data transfers. The method may include accessing, by the configuration generator of the computing system, certificate data indicating a certificate chain from a certificate service. The method may include generating, by the configuration generator of the computing system, a configuration script based at least in part on the configuration data and including at least a portion of the certificate data in the certificate data. The method may include generating, by the configuration generator of the computing system, a script hash based on at least a portion of the configuration script. The method may include receiving, by the configuration generator of the computing system, a validation signature for the configuration script from the certificate service. The method may include providing, by the computing system, the configuration script, the script hash, and the validation signature to a user device may include the application used for secure data transfers such that the application is modified using the configuration script.

In some embodiments, the method may include generating, on a hardware security module of the computing system, a root certificate. The method may include signing, by the computing system, the application using the root certificate. The method may include providing, by the computing system, the application and a hash of a public key associated with a static configuration load management (SCLM) root certificate to the user device, such that the application is loaded on a secure partition of the user device and the public key is stored on the user device.

In some embodiments, the method may include generating, by the certificate service of the computing system, a static configuration load management (SCLM) root certificate. The method may include generating, by the certificate service of the computing system, an intermediate certificate based at least in part on the SCLM root certificate. The method may include generating, by the certificate service of the computing system, a leaf certificate based at least in part on the intermediate certificate, the leaf certificate used for the validation signature. The certificate service and the configuration generator may be implemented on separate servers. The certificate service and the configuration generator may be implemented on a cloud-based architecture. The configuration data may be received via a configuration portal. The user device may include a secure partition associated with the computing system. The user device may request the configuration script from the computing system via one or more application programming interface (API) calls.

A system may include one or more processors. The system may include a computer-readable memory including instructions that, when executed by the one or more processors, cause the system to perform operations. According to the operations, the system may receive, by a configuration generator of a computing system, configuration data associated with an application used for secure data transfers. The system may access, by the configuration generator of the computing system, certificate data indicating a certificate chain from a certificate service. The system may generate, by the configuration generator of the computing system, a configuration script based at least in part on the configuration data and including at least a portion of the certificate data in the configuration script. The system may generate, by the configuration generator of the computing system, a script hash based at least in part on at least a portion of the configuration script. The system may receive, by the configuration generator of the computing system, a validation signature for the configuration script from the certificate service, the validation signature may include a public key. The system may provide, by the computing system, the configuration script with the script hash and the validation signature to a user device may include the application used for secure data transfers such that the application is modified using the configuration script.

In some embodiments, the system may generate, on a hardware security module of the computing system, a root certificate. The system may sign, on the hardware security module (HSM) of the computing system, the application using the root certificate. The system may provide, by the computing system, the application and a key hash of a public key associated with a static configuration load management root certificate to the user device, such that the application is loaded on a secure partition of the user device and the key hash is stored on the user device. The certificate service and the configuration generator may be implemented on separate servers. The certificate service and the configuration generator may be implemented on a cloud-based architecture. The configuration data may be received via a configuration portal. The user device may include a secure element associated with the computing system. The user device may request the configuration script from the computing system via one or more application programming interface (API) calls.

A non-transitory computer-readable memory may include instructions that, when executed by one or more processors, cause the one or more processors to perform operations. The operations may include receiving, by a configuration generator of a computing system, configuration data associated with an application used for secure data transfers. The operations may include accessing, by the configuration generator of the computing system, certificate data indicating a certificate chain from a certificate service. The operations may include generating, by the configuration generator of the computing system, a configuration script based at least in part on the configuration data and including at least a portion of the certificate data in the configuration script. The operations may include generating, by the configuration generator of the computing system, a script hash based at least in part on at least a portion of the configuration script. The operations may include receiving, by the configuration generator of the computing system, a validation signature for the configuration script from the certificate service. The operations may include providing, by the computing system, the configuration script with the script hash and the validation signature to a user device may include the application used for secure data transfers such that the application is modified using the configuration script.

In some embodiments, the certificate service and the configuration generator may be implemented on separate servers. The certificate service and the configuration generator may be implemented on a cloud-based architecture. The configuration data may be received via a configuration portal. The user device may include a secure partition associated with the computing system.

BRIEF DESCRIPTION OF THE DRAWINGS

FIGS. 2A-C illustrates a system for provisioning a user device for performing secure data transfers, according to certain embodiments.

DETAILED DESCRIPTION

Figure 1:
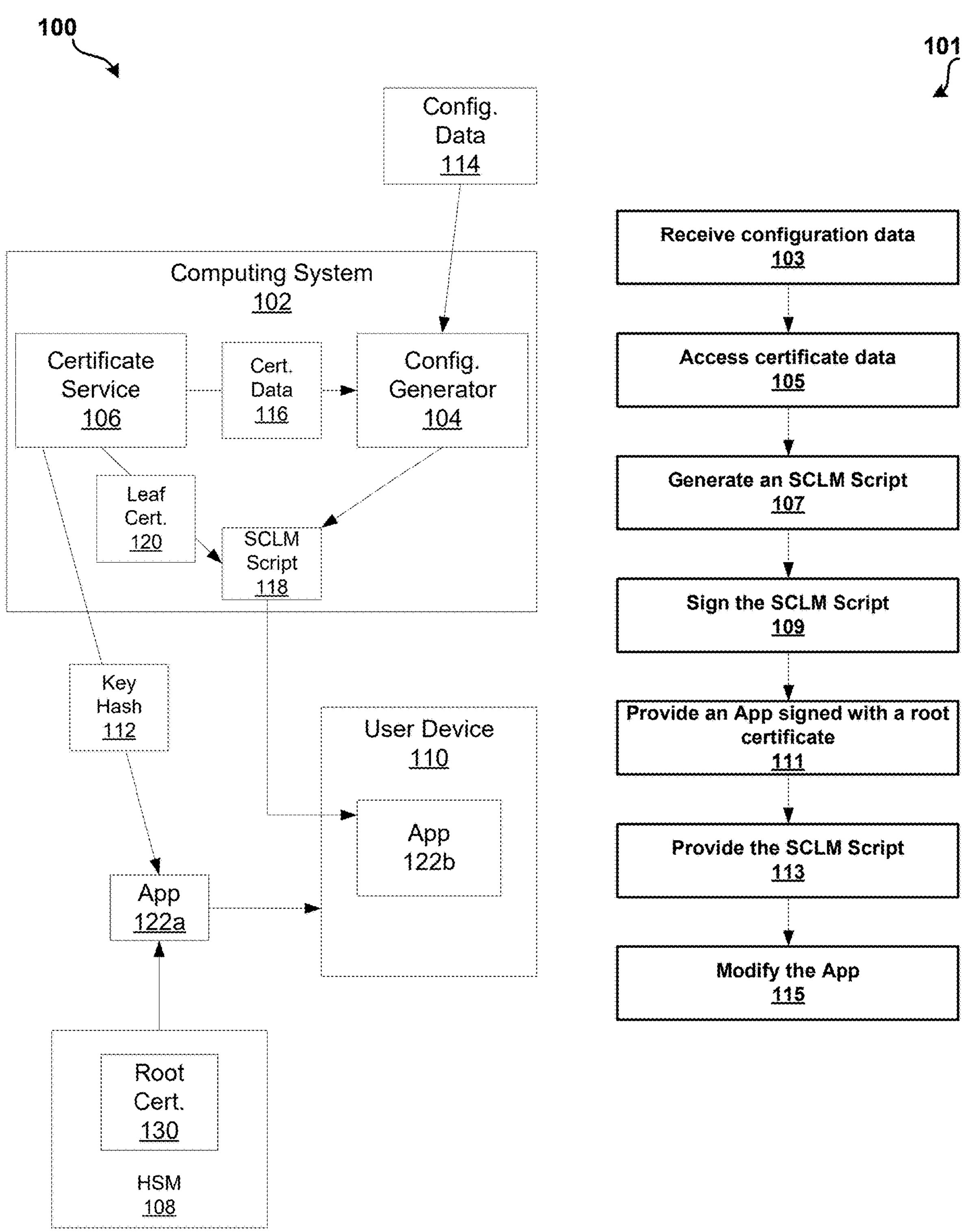
FIG. 1 illustrates a system 100 and a process 101 for configuring a user device 110 to perform sensitive data transfers, according to certain embodiments.

Sensitive data may be transferred between parties in order to complete any number of tasks. The security of this data is of paramount importance to the owners of the data. A heightened sensitivity to the security of this data has led to many governments, companies, and other such entities to establish laws, policies, and regulations to guarantee the security of sensitive data. In many cases, not only must the sensitive data be handled securely, but the applications, etc., used by various devices to perform data transfers must also be secure.

A user device may be configured to handle secure data transfers by an associated entity (e.g., a manufacturer). The manufacturer may include a secure partition (e.g., a physical and/or logical partition) on the user device. The secure partition may only be accessed by the manufacturer, allowing any data (e.g., applications) installed therein to be trusted, as long as the manufacturer and data are trusted. Some data may not require the same level of security as other data, however. For example, a first application may be installed (in whole or in part) within the secure partition, but because the first application may not directly access and/or transfer sensitive data, the first application may be stored and installed in any number of servers, computing systems, etc. In other words, while certain portions of the first application should not be tampered with, the risk of exposing sensitive data may be low enough that a complete chain of trust for the first application is not necessary.

On the other hand, some applications and/or data may require a complete chain of trust. For example, electronic payments require the transfer of sensitive data between several parties in order to complete a transaction. The user device may collect payment data (e.g., card numbers, account numbers, etc.) and store and/or transfer the sensitive data to one or more processors depending on a payment type, etc. Because payment data is highly sensitive (and highly regulated), applications (and associated data) may need to be trusted at all levels, maintaining a complete chain of trust. To maintain the chain of trust, the manufacturer may include a computing system with a hardware security module (HSM). The HSM may store cryptographic keys, certificates, and other data used as a source of trust for various data and applications. To limit the exposure of the data stored on the HSM, access to the HSM may be limited-physically and/or digitally. In some cases, the HSM may only be accessed by certain individuals and at certain times. Thus, when an application for performing secure data transfers is to be installed on the user device, the manufacturer may establish a secure connection and/or physical access to the user device in order to install the application. The application may then be signed using the keys/certificates stored on the HSM to sign the application (or data associated therewith), guaranteeing the integrity of the application.

While the above process may be secure enough to satisfy users, data processors, and other entities, the process may be difficult and inefficient to implement. For example, each data processor may have a unique set of protocols, keys, preferences, etc. used to perform sensitive data transfers (e.g., transactions). Thus, each time a data processor updates a policy etc., or the user device desires access to a new data processor, the manufacturer may need to establish the secure connection to the HSM or gain physical access to the user device. Establishing the secure connection to the HSM may require a key or other information to be stored on the user device in order to authenticate the device. Storing the necessary keys and/or authentication information introduce a risk of exposure to the data on the HSM. Because the HSM is a source of trust for the user device and any number of other devices, any risk of exposure—even a minimal one—may be too great. Thus, applications for sensitive data transfers may only be performed via physical access to the user device. Consequently, updating and/or installing new applications may be performed infrequently and inefficiently. Methods and systems for configuring and installing applications for performing secure data transfers more efficiently are therefore needed.

One solution may be to establish a second source of trust in order to guarantee the integrity of applications for sensitive data transfer. An entity (e.g., a manufacturer of a user device) may create a security domain including a secure partition on the user device and security infrastructure on a computing system (e.g., an HSM). The HSM may include a root certificate used to guarantee the integrity of data loaded and installed within the secure partition. Because the secure partition on the user device, the secure partition may include a public key of the root certificate, without exposing data to unnecessary risk. The computing system may also include a certificate service. The certificate service may include a static configuration load management (SCLM) root certificate with a public key and a secret key, generated from a trusted certificate authority. The SCLM root certificate may then be used to create a certificate chain with one or more intermediate certificates.

To install an application for sensitive data transfers on the user device, a generic application may be provided by the entity to the user device. The generic application may be signed using the root certificate. The generic application may also include a hash of the public key of the SCLM root certificate. Once the generic application is received by the user device, the root certificate may be verified using the public key of the root certificate. Thus, the user device may trust that the generic application is unmodified.

In order to perform secure data transfers, however, the generic application may be modified to conform to the policies, procedures, etc. of each of the data processors. A request for a configuration script identifying these policies may be received by a configuration generator of the computing system. The configuration generator may then generate a script to be used by the user device to configure (or personalize) the generic application to be able perform the secure data transfers. The configuration generator may also generate a hash of the configuration script and/or configuration data and provide the hash to the certificate service. The certificate service may then generate a leaf certificate, including the hash, and sign the configuration script with the leaf certificate. The configuration script may then be provided to a kernel of the generic application within the secure partition of the user device. The user device may then compare the public key of the leaf certificate to the hash of the public key of the SCLM root certificate to verify that the configuration script can be trusted. Furthermore, the hash of the configuration script may be verified against the configuration script itself. Thus, if the configuration script is tampered with or attacked in any way between the configuration generator and the user device, the tampering may be discovered, and the script rejected. After verifying the configuration script completely (e.g., the leaf certificate and the hash of the script), the configuration script may then be executed within the secure partition, and the generic application modified. The user device may then perform secure data transfers using the modified application. Because the generic application is trusted based on the root certificate, and the configuration script is trusted based on the SCLM root certificate, a chain of trust may be maintained and verified for the application and any sensitive data handled thereby.

FIG. 1 illustrates a system 100 and a process 101 for configuring a user device 110 to perform sensitive data transfers, according to certain embodiments. The system 100 may include a computing system 102 with a configuration generator 104 and a certificate service 106. The system 100 may also include the user device 110 and an HSM 108. The computing system 102 may be one or more physical and/or virtual machines, working separately and/or in conjunction with one another. The computing system 102 may therefore include one or more servers or other computing devices, and/or may be a distributed cloud-based computing system. The computing system 102 may be associated with an entity such as a manufacturer of the user device 110. Thus, some or all of the components of the computing system 102 may be configured to securely communicate with the user device 110 such that the data communicated is inaccessible to a user of the user device.

The configuration generator 104 may include hardware and/or software components configured to generate a configuration script based on provided data. The configuration generator 104 may be accessible to one or more data processors or other entities via a configuration portal. The configuration portal may be implemented by an application on a computing device, a web-based portal, or any other suitable implementation.

The certificate service 106 may be configured to provide certificates and/or signatures to configuration scripts from the configuration generator 104. The certificate service 106 may be a self-issuing certificate authority, generating an SCLM root certificate with a public key and a private key. Additionally or alternatively, the certificate service 106 may obtain an SCLM root certificate from an external certificate authority. In either case, the certificate service 106 may generate certificates (e.g., intermediate certificates, leaf certificates, etc.) based on the SCLM root certificate.

The HSM 108 may be included in the computing system 102 or may be implemented on a separate computing system. The HSM 108 may be part of a security domain of the entity, and include a root certificate 130. The root certificate 130 may include a public key and a private key. The root certificate 130 may be used as a source of truth by the entity, authenticating applications, data, etc. for the user device 110 and/or other devices. The HSM 108, therefore, may be highly sensitive with limited access physically and/or electronically. The HSM 108, being part of the security domain, may be able to transmit and/or receive data to the user device 110 (e.g., the secure partition).

The user device 110 may be a mobile phone, tablet, laptop, desktop, wearable, and/or any other computing device. The user device 110 may be used, at least in part, for performing secure data transfers. For example, the user device 110 may be configured to collect payment data (e.g., an account number, card number, personal identification number (PIN), primary account number (PAN), etc.). The user device 110 may collect the payment data via magnetic strip reader, wireless communication (e.g., Wi-Fi, near field communication (NFC), Bluetooth, etc.). The user device 110 may include a secure partition (e.g., a physical or logical partition) to store and/or process sensitive data such as payment data. The secure partition may be included in the security domain of the entity. Thus, the data stored and/or processed within the secure partition may be inaccessible to a user of the user device 110.

At 103, the configuration generator 104 may receive configuration data 114. The configuration data 114 may identify characteristics and/or policies associated with data transfers, one or more data processors, and/or other data transfer related information. For example, the configuration data 114 may identify a payment card type to be accepted for a secure data transfer, a transfer limit (e.g., a maximum amount to be accepted in any data transfer), communication protocols (e.g., with a particular data processor), encryption keys associated with the data processor, and other such information. Put differently, the configuration data 114 may correspond to a profile of a data processor. The profile, once loaded onto the user device 110, may allow the user device 110 to perform secure data transfers using the data processor.

At 105, the configuration generator 104 may insert certificate data 116. The certificate data 116 may include information about the certificate service 106 and/or a certificate chain administered by the certificate service 106. For example, the certificate data 116 may indicate information about the SCLM root certificate (e.g., whether the certificate authority is the certificate service 106 or an external certificate authority), intermediate certificates, public keys of any of the certificates of the certificate service 106, and other such information.

At 107, the configuration generator 104 may generate an SCLM script 118. The SCLM script 118 may include binary code used to modify an application installed on the user device 110. The SCLM script 118 may be based, at least in part, on the configuration data 114. The SCLM script 118 may also include and/or identify the certificate data 116. Thus, the SCLM script 118 may identify the certificate service 106 and the certificate chain used to authenticate the certificate service 106 as a source of trust.

At 109, the SCLM script 118 may be signed using a leaf certificate 120. The leaf certificate 120 may be the last certificate in the certificate chain, stemming from the SCLM root certificate. As such, the leaf certificate 120 may include and/or indicate the public key of the SCLM root certificate. Because the SCLM script 118 may include the certificate data 116, the user device 110 may be able to verify that the leaf certificate 120 is genuinely associated with the certificate chain and the SCLM root certificate. The leaf certificate

120 may also include a configuration hash. The configuration hash may be generated by the configuration generator 104 and/or the certificate service 106. In some embodiments, the configuration hash may be generated by some other component of the computing system 102.

At 111, an application 122*a* may be provided to the user device 110. The application 122*a* may be a generic application that enables the user device 110 to perform secure data transfers. The application 122*a* may be signed with the root certificate 130 on the HSM 108. For example, the application 122*a* may be a financial transaction application configured to collect and transmit payment data and/or personally identifying information. The application 122*a* may therefore require stringent security protocols. Thus, the application 122*a* may be signed and provided to the user device 110 via the security domain, minimizing a risk of exposing the application 122*a* to tampering and/or attacks.

The computing system 102 may also provide a key hash 112 with the application 122*a*. The key hash may be based, at least in part, in the public key of the SCLM root certificate from the certificate service 106. Thus, the application 122*a* may verify the certificate chain, leaf certificate 120, and/or the signatures provided by the computing system 102. Instead of using the root certificate 130 as the source of trust for all installation, the user device 110 and/or the application 122*a* may therefore utilize the certificate service 106 as a source of trust.

At 113, the computing system 102 may provide the SCLM script 118 to the user device 110. The SCLM script 118 may be provided by the configuration generator 104 and/or some other component of the computing system 102. After receiving the SCLM script 118, the user device (and/or the application 122*a*) may verify some or all of the SCLM script 118. For example, the user device 110 may access the public key of the SCLM root certificate and/or the certificate data 116. The user device 110 may then verify the public key of the SCLM root certificate using the key hash 112. The user device 110 may therefore be assured that the SCLM script 118 was generated by the computing system 102. Additionally, the user device 110 may utilize the configuration hash included in the SCLM script to verify the integrity of the SCLM script 118. In part because of these checks and verifications, the SCLM script 118 may be provided to the user device 110 via any connection, secure or otherwise. In other words, the SCLM script 118 may be provided to the user device 110 outside of the security domain.

At 115, the user device 110 (and/or the application 122*a*) may execute the SCLM script 118 to modify the application 122*a*, creating the application 122*b*. The application 122*b* may now include one or more profiles for respective data processors. The application 122*b* may be thought of as being based on the application 122*a*. The application 122*a* may provide the general framework and functionality for performing secure data transfers. The general framework and functionality may be trusted by users, data processors, and/or other entities (e.g., governments), as the application 122*a* is managed by the entity associated with the computing system 102 and provided within the security domain. The application 122*b* may therefore also be trusted, as the modifications made by the SCLM script 118 may not alter the general framework and functionalities but provide rules and protocols for respective data processors. Thus, using the system 100 and the process 101, the user device 110 may be configured to perform secure data transfers more quickly and efficiently while ensuring the security of any sensitive data collected and/or transferred.

Figure 2A:
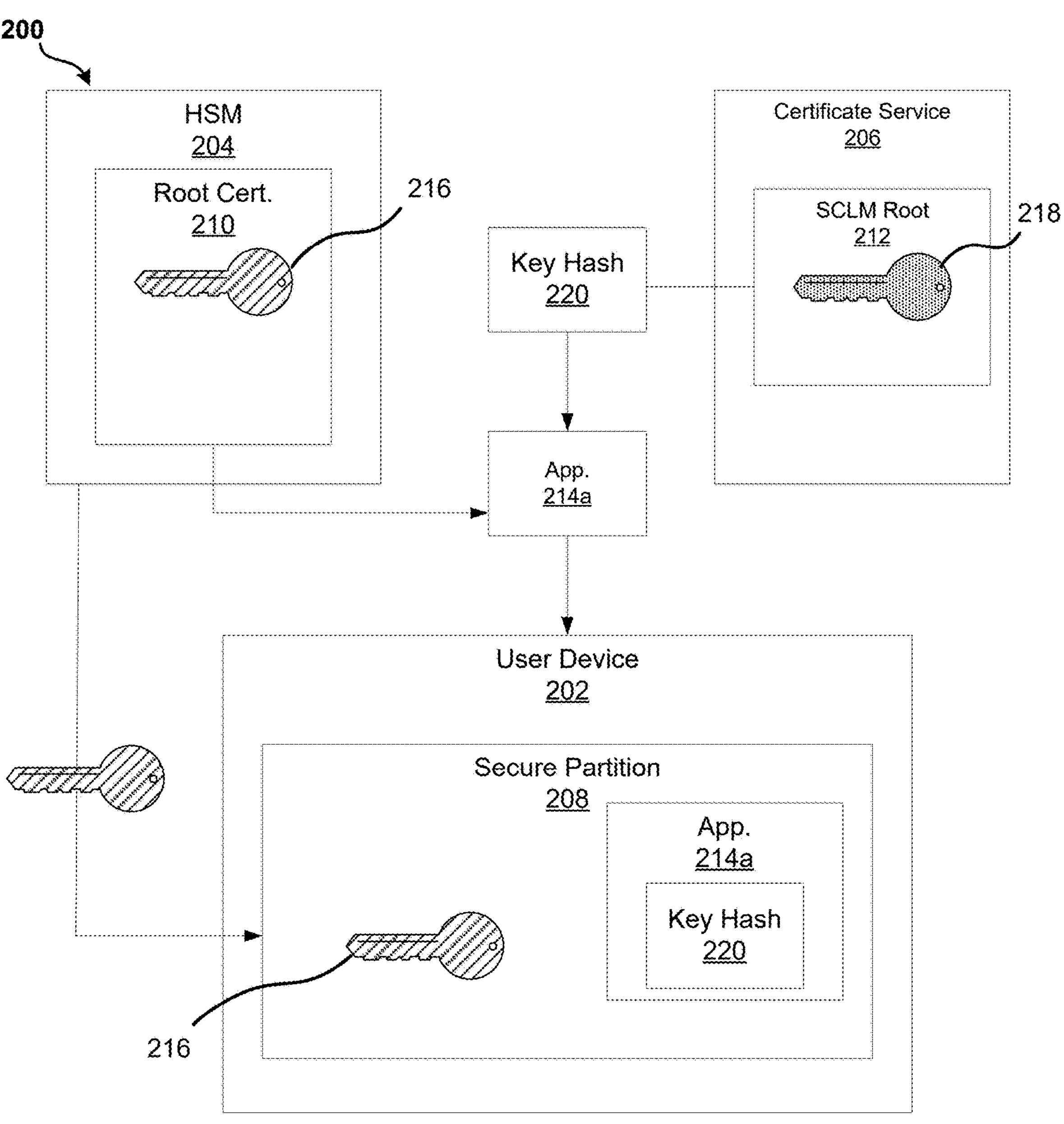

FIG. 2A illustrates a system 200 for provisioning a user device 202 for performing secure data transfers, according to certain embodiments. The system 200 may be similar to some or all of the system 100 in FIG. 1. The system 200 may include the user device 202, an HSM 204, and a certificate service 206. The HSM 204 and the certificate service 206 may be implemented on a computing system of the entity (e.g., the computing system 102). In some embodiments, the HSM 204 and the certificate service 206 may be hosted on separate computing systems. The user device 202 may be similar to the user device 110 in FIG. 1. As such, the user device 202 may include a mobile phone, tablet, computer, laptop, or any other such computing device. The user device 202 may additionally or alternatively include hardware and/or software for collecting sensitive data for use in secure data transfers (e.g., a payment terminal). For example, the user device 202 may be a tablet configured to accept payment data (e.g., card numbers, a PIN, a PAN, identification information etc.) via wireless communication.

The user device 202 may include a secure partition 208. The secure partition 208 may be a physical and/or logical partition used to store and/or process sensitive data such that a user of the user device 202 may not access the sensitive data. An entity associated with the user device 202 may be able to access the sensitive data on the secure partition 208 via one or more applications, APIs, or other suitable methods. For example, the entity may transmit sensitive data such as authentication keys, software/firmware updates, and other data files to the user device 202 to be stored within the secure partition 208. Then, to perform certain tasks, the user device 202 and/or applications executed thereon (e.g., an operating system) may utilize the sensitive data without exposing the sensitive data to the user.

Additionally or alternatively, the user device 202 may accept sensitive data from other sources and store and/or process the sensitive data on the secure partition. Continuing the example from above, the user device 202 may collect payment data from a third party. Because payment data may be highly sensitive, the user device 202 may store the payment data within the secure partition such that a user of the user device 202 may not access the payment data. Then, various applications may access the payment data in order to complete a transaction.

The HSM 204 may be similar to the HSM 108 in FIG. 1. The HSM 204 may include a secure hardware device configured to store sensitive information such as cryptographic keys, certificates, etc. The HSM 204 may be highly sensitive with limited access, physically and/or electronically.

The HSM 204 and the secure partition 208 may be considered part of a security domain of the entity. The security domain may include one or more devices, software, and partitions. Access to some or all of the security domain may be restricted to only be accessed by the entity. For example, the entity may be a manufacturer of the user device 202 (and other similar devices). The manufacturer may store keys, passwords, authentication information, etc. on the HSM 204 and push some or all of the information to the secure partition 208. Using the information, the user device may perform various operations (e.g., software updates) without exposing the sensitive information to the user of the user device 202 (and/or other users).

The HSM 204 may include a root certificate 210. The root certificate 210 may include a public key 216. The root certificate 210 may be a certificate issued by the entity (i.e., a self-issued certificate), or the root certificate 210 may be issued by an external certificate authority. The root certificate 210 may be used by the entity to provide a source of trust for some or all of the sensitive data sent to the user device 202 within the security domain. For example, the entity may transmit a firmware update to the user device 202. In order to guarantee the authenticity of the firmware update, the entity may sign the firmware update using the root certificate 210. Furthermore, entity may cause some or all of the public key 216 to be stored in the secure partition 208. When the user device 202 receives the firmware update, the user device 202 may verify the signature (i.e., the root certificate) using the public key 216. Thus, the user device 202 may be certain that the firmware update can be trusted.

Because the root certificate 210 is stored and used within the security domain, the root certificate 210 may be used as a source of trust for data communicated between the entity and the user device 202. Certain types of data transfers (e.g., financial transactions), may require high levels of security in order to minimize any risks of exposure of sensitive data. These security levels may be dictated by data processors, governments, and/or other interested parties. The security domain of the entity (e.g., the HSM 204 and the secure partition 208) may therefore be used to provide applications (e.g., an application 214*a*) to the user device 202. As only the entity may access the security domain, the data provided within the security domain may be trusted as the entity is trusted. In the case of financial transactions, for example, the security domain provides a trusted environment through which data and applications can be assured (or reasonably so) that the data and applications are authentic and that the integrity thereof (e.g., the data/applications have not been attacked or tampered with by a bad actor) is guaranteed.

The certificate service 206 may also be associated with the entity, but may not be part of the security domain. The certificate service 206 may be implemented on one or more physical and/or virtual machines associated with the entity. The certificate service 206 may be hosted on a cloud-computing environment, and/or on one or more physical servers. The certificate service 206 may include an SCLM root certificate 212. The SCLM root certificate 212 may be a self-issued certificate or be issued by an external certificate authority. The SCLM root certificate 212 may include an associated public key 218.

The user device 202 may be provisioned to perform secure data transfers by installing the application 214*a*. The application 214*a* may be a generic application, providing basic functionality for performing secure data transfers. For example, the application 214*a* may provide binary code as a kernel to the user device 202. After installing the application 214*a*, the user device 202 (and/or applications thereof) may be able to access various peripheral devices, components of the user device (e.g., wireless antennas, etc.), interact with an operating system of the user device 202, cause data to be stored and/or accessed from the secure partition 208, and other such tasks. Put differently, the application 214*a* may provide software, hardware, and/or firmware pathways for performing secure data transfers.

A key hash 220 based at least in part on the public key 218 may be generated by the certificate service 206 and/or some other component of the entity. The key hash 220 may be generated using a secure hash algorithm (e.g., SHA-256). The application 214*a* may then be signed by the entity using the root certificate 210 stored on the HSM 204. Then, the application 214*a* may be provided to the user device 202. Some or all of the application 214*a* may be implemented on the secure partition 208 to prevent alteration by a user of the user device 202 (or some other party).

Figure 2B:
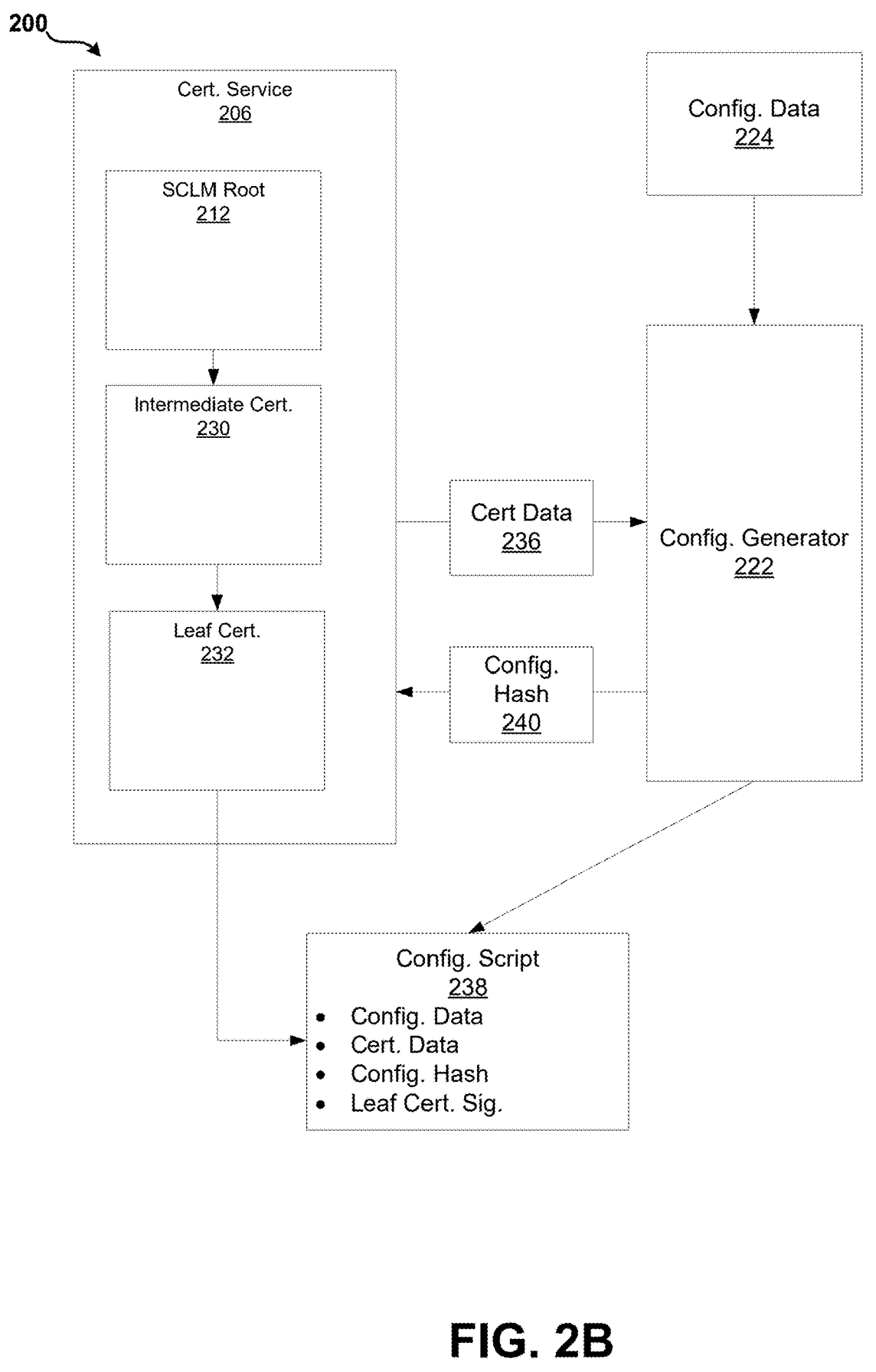

In FIG. 2B, the system 200 may generate a configuration script 238. As shown in FIG. 2B, the system 200 may further include a configuration generator 222. The configuration generator 222 may be similar to the configuration generator 104 in FIG. 1. The configuration generator 222 may include one or more hardware and/or software components operating independently and/or in conjunction with one another to generate the configuration script 238. The configuration script 238 may include code (e.g., binary code) that is used to configure or otherwise modify the application 214*a*.

The configuration generator 222 may be configured to accept configuration data 224 via a user interface, web portal, or any other appropriate means. The configuration data 224 may include information associated with one or more data processors. The information may include and/or identify encryption protocols and tools, policies, regulations, addresses, and other such information as needed to enable the user device 202 to communicate with the data processor. For example, the configuration data 224 may include a maximum transaction amount, a card/payment type, IP addresses needed to transmit payment data and/or other payment data.

As shown in FIG. 2B, the certificate service 206 may generate an intermediate certificate 230. The intermediate certificate 230 may be based (or signed) by the SCLM root certificate 212. The intermediate certificate 230 may indicate and/or include the public key of the SCLM root certificate 212. Thus, a chain of trust may link the intermediate certificate 230 to the SCLM root certificate. Likewise, the certificate service 203 may generate a leaf certificate 232 (in response to a request from the configuration generator 222). The leaf certificate 232 may indicate and/or include the public key of the intermediate certificate 230 and/or the SCLM root certificate 212. Thus, the leaf certificate 232 may be trusted just as the intermediate certificate 230 is trusted.

Upon receiving the configuration data 224, the configuration generator 222 may access the certificate data 236 from the certificate service 206. The configuration generator 222 may access the certificate data 236 by transmitting a response directly to the certificate service 206 by making one or more API calls, and/or any other suitable method. The certificate data 236 may indicate and/or include the SCLM root certificate 212, the intermediate certificate 230, and the leaf certificate 232. In other words, the certificate data 236 may indicate the certificate chain (chain of trust) established by the certificate service 206.

The configuration generator 222 may then generate a configuration hash 240. The configuration hash 240 may be based on some or all of the configuration data 224. In some embodiments, the configuration generator 222 may generate the configuration script 238 and then generate the configuration hash 240 based on at least a portion of the configuration script 238. The configuration script 238 may be generated using a secure hash algorithm (e.g., SHA-256).

The configuration hash 240 may then be provided to the certificate service 206 (e.g., via an API call). The certificate service 206 may then include the configuration hash 240 in the leaf certificate 232. The configuration script 238 may then be signed with the leaf certificate 232 and transmitted to the user device 202.

Figure 2C:
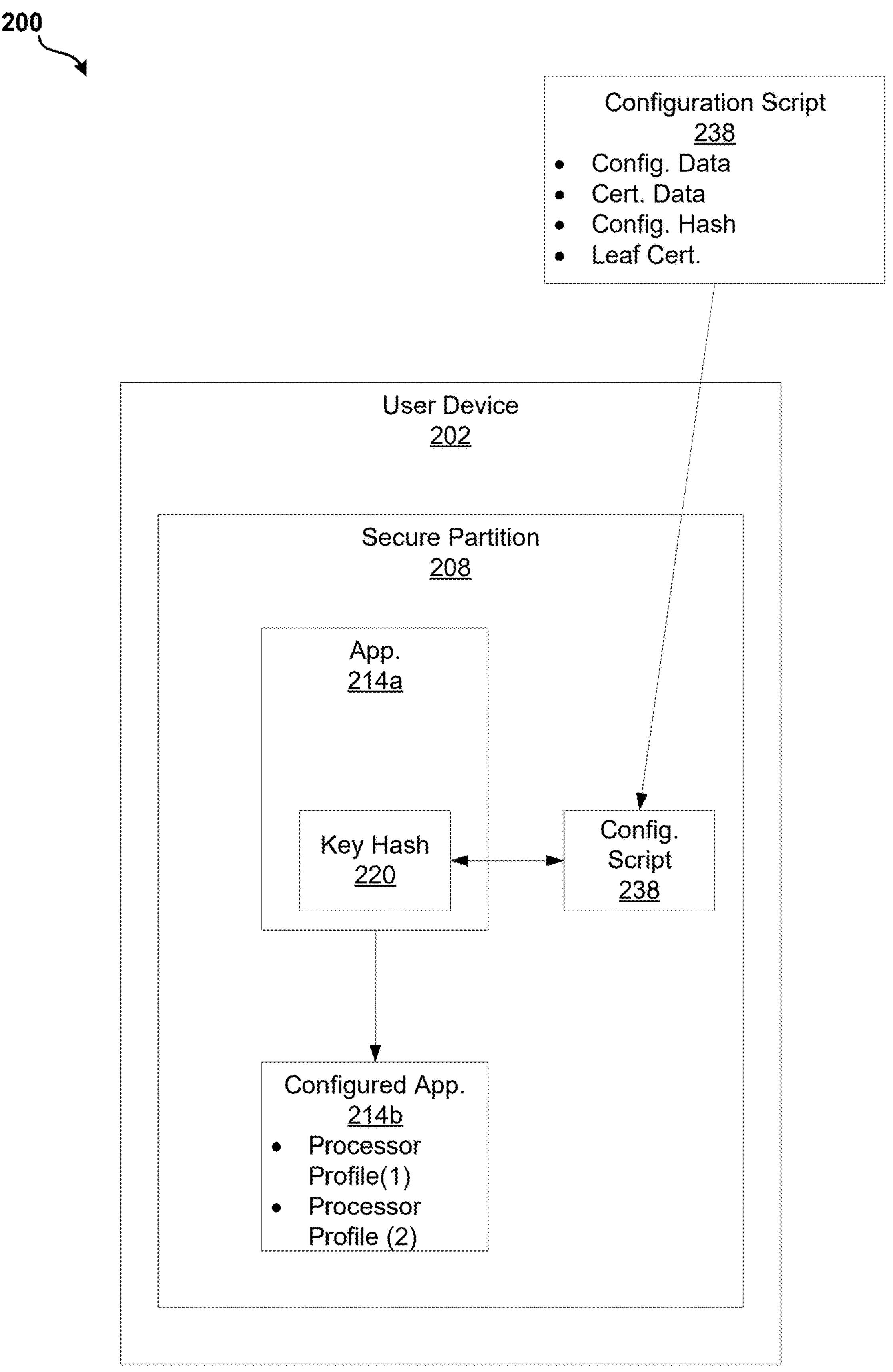

As shown in FIG. 2C, the configuration script 238 may include or indicate the configuration data 224, the certificate data 236, the configuration hash 240, and the leaf certificate 232. The configuration script 238 may then be transmitted to the user device 202. The configuration script 238 may be stored and processed within the secure partition 208. The user device 202 (and/or the application 214*a*) may then verify some or all of the information and data included in the configuration script 238. For example, the user device 202 may verify that the configuration script 238 was actually generated by the entity (or a computing system associated therewith). When the application 214*a* was installed in the secure partition of the user device 202, the key hash 220 may be included as well. The key hash 220 may be based on the public key 218 of the SCLM root certificate 212. Upon receiving the configuration script 238, the user device 202 may access the public key of the SCLM root certificate 212 (e.g., from the leaf certificate 232 and/or the certificate data 236). The user device 202 may then generate a hash of the key(s) included in the leaf certificate 232 and/or the certificate data 236 and compare the result to the key hash 220. If the result and the key hash 220 are the same, then the user device 202 may trust that the configuration script 238 was generated by the configuration generator 222 and signed by the certificate service 206.

However, the configuration script 238 may have been intercepted and modified after being generated (e.g., by a bad actor). The user device 202 may then generate a hash of some or all of the configuration script 238. The resulting hash may then be compared to the configuration hash 240, included in the configuration script 238. If the resulting hash and the configuration hash 240 match, then the user device 202 may trust that the configuration script 238 is unaltered. Put differently, the user device 202 may verify the authenticity and the integrity of the configuration script 238. The key hash 220 may be used to verify that the configuration script 238 is authentic, being generated by the configuration generator 222. The configuration hash 240 may be used to verify the integrity of the configuration script 238, meaning that is unaltered.

Then, the user device 202 may execute the configuration script 238, to configure the application 214*a* to be configured application 214*b*. The configured application 214*b* may include the same basic functionalities of the application 214*a*, but include one or more profiles (e.g., policies, protocol's, etc.) of one or more data processors. In other words, the configured application 214*b* may enable the user device 202 to perform data transfers (e.g., transactions) with various data processors.

Generally, applications responsible for sensitive data transfers may be installed and configured wholly within the security domain. Although this method may provide sufficient security, updating and modifying these applications on the fly may be impractical. However, because the configuration script 238 may be trusted both in authenticity and integrity, the systems described in FIGS. 2A-2C may enable these applications to be updated conveniently and more often, gaining efficiency and heightened security.

Figure 3:
FIG. 3 illustrates a method 300 for dynamically configuring an application to perform secure data transfers, according to certain embodiments.
Figure 3:
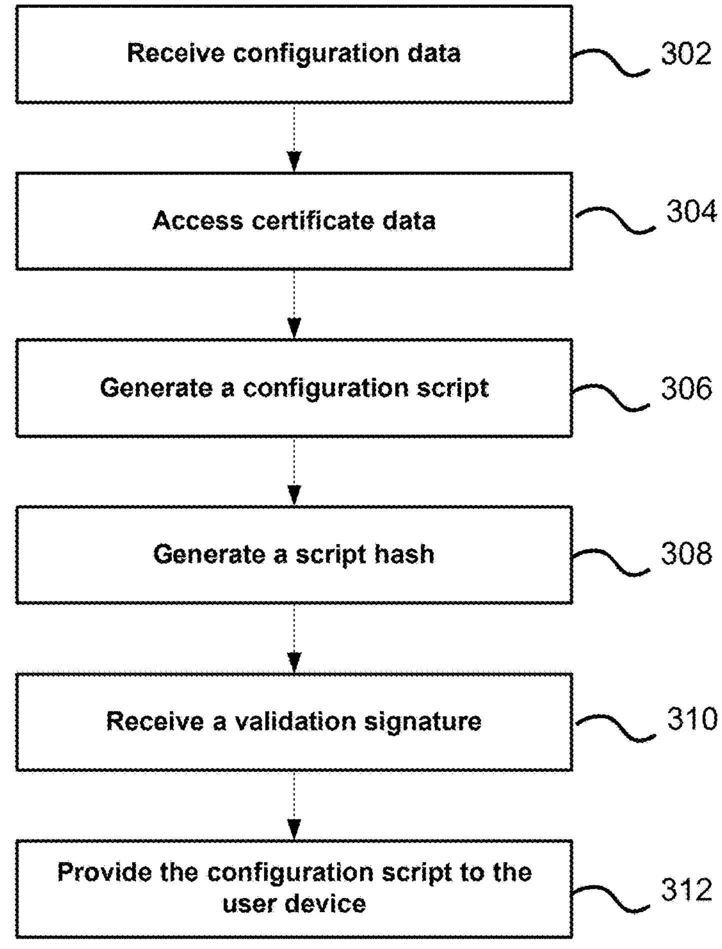

FIG. 3 illustrates a method 300 for dynamically configuring an application to perform secure data transfers, according to certain embodiments. The method 300 may be performed by some or all of the systems and devices described in FIGS. 1-2C. Some steps of the method 300 may be performed in a different order than is shown and described herein and/or combined with other steps. In some embodiments, some steps may be skipped altogether.

At 302, the method 300 may include receiving, by a configuration generator of a computing system, configuration data associated with an application used for secure data transfers. The computing system may be similar to the computing system 102 in FIG. 1. As such, the computing system may be one or more physical and/or virtual machines configured to operate independently and/or in conjunction with one another. The computing system may be associated with an entity, such as a manufacturer of a user device.

The configuration data may include and/or identify encryption protocols and tools, policies, regulations, addresses, and other such information as needed to enable the user device to communicate with the data processors. For example, the configuration data may include a maximum transaction amount, a card/payment type, IP addresses needed to transmit payment data and/or other payment data.

At 304, the method 300 may include accessing, by the configuration generator of the computing system, certificate data indicating a certificate chain from a certificate service. The certificate service may be similar to the certificate service 206 described in FIGS. 2A-C. The certificate service may include a static configuration load management (SCLM) root certificate. The SCLM root certificate may be used to generate one or more intermediate certificates and/or a leaf certificate. The certificate chain indicated in the certificate data may include some or all of the SCLM root certificate, the intermediate certificate(s), and/or the leaf certificate.

In some embodiments, the SCLM root certificate may be self-issued (by the certificate service). Then, the method 300 may include generating, by the certificate service of the computing system, the SCLM root certificate. The method 300 may include generating, by the certificate service of the computing system, an intermediate certificate based at least in part on the SCLM root certificate. The method 300 may also include generating, by the certificate service of the computing system, a leaf certificate based at least in part on the intermediate certificate.

At 306, the method 300 may include generating, by the configuration generator of the computing system, a configuration script based at least in part on the configuration data and including the at least a portion of the certificate data. The configuration script may be similar to the configuration script 238 in FIG. 2C. The configuration script may include code and/or pseudocode that may be used to modify the application. In some embodiments, the configuration script may include binary code.

At 308, the method 300 may include generating, by the configuration generator of the computing system, a script hash based on at least a portion of the configuration script. The configuration generator may utilize a secure hash algorithm such as SHA-256. The script hash may be provided to the certificate service and included in the leaf certificate. By including the script hash in the leaf certificate, the leaf certificate may be identified solely with the configuration script (i.e., not used to sign any other data).

At 310, the method 300 may include receiving, by the configuration generator of the computing system, a validation signature for the configuration script from the certificate service. The validation signature may be made using the leaf certificate (e.g., the leaf certificate 232). The validation signature may also include a public key associated with the SCLM root certificate and/or the leaf certificate. By signing the configuration script with the validation signature, the authenticity of the configuration script may be assured. In other words, the user device may be able to trust that the configuration script originated from the computing system (i.e., the manufacturer).

At 312, the method 300 may include providing, by the computing system, the configuration script, the script hash, and the validation signature to a user device including the application used for secure data transfers such that the application is modified using the configuration script. For example, the application may be a generic application, providing a general framework through which data transfers may be performed. The configuration script may cause one or more profiles of the data processors to be installed on the user device and/or the application. Thus, the application may perform secure data transfers with the one or more data processors corresponding to the profiles.

In some embodiments, the method 300 may include generating, on a hardware security module (HSM) of the computing system, a root certificate. The HSM may be a hardware and/or software component configured to securely hold data. The root certificate may be a source of trust for the entity (e.g., the manufacturer). The root certificate may be self-issued (e.g., by the entity) and/or the root certificate may be issued by an external certificate authority. The method 300 may also include signing, by the computing system, the application using the root certificate. The method 300 may also include providing, by the computing system, the application and a key hash (e.g., the key hash 220) associated with a static configuration load management (SCLM) root certificate to the user device, such that the application is loaded on a secure partition of the user device and the public key is stored on the user device.

The user device may verify the authenticity and the integrity of the configuration script. The key hash may be used to verify that the configuration script 238 is authentic, being generated by the configuration generator. The script hash may be used to verify the integrity of the configuration script, meaning that is unaltered.

Figure 4:
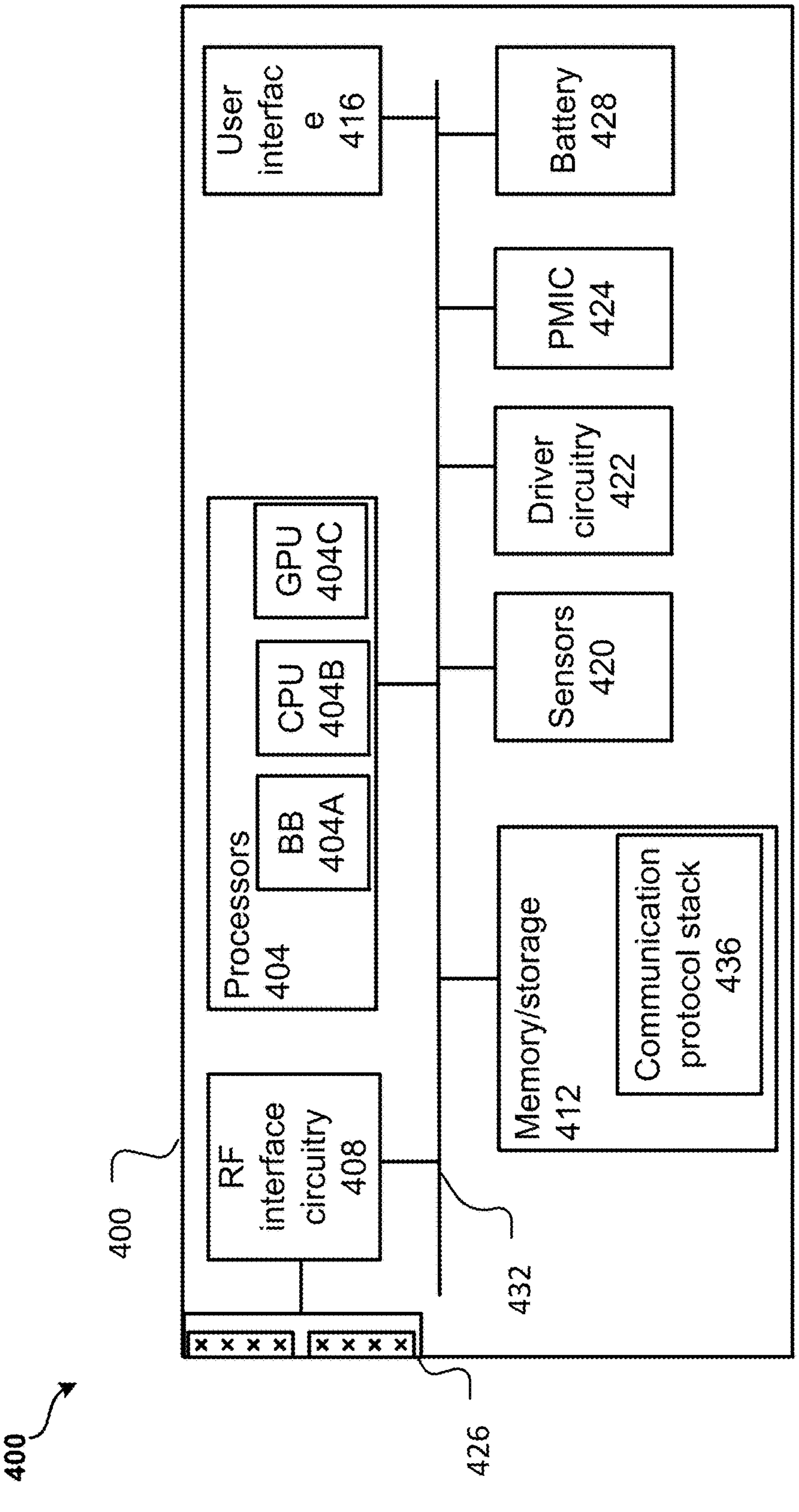
FIG. 4 illustrates an example user equipment (UE) in accordance with some embodiments.

FIG. 4. illustrates an example user equipment (UE) 400 in accordance with some embodiments. The UE 400 may be an example of a user device (e.g., the user device 110 in FIG. 1) that may utilize configuration scripts generated by the system. The UE 400 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 400 may be a RedCap UE or NR-Light UE.

The UE 400 may include processors 404, RF interface circuitry 408, memory/storage 412, user interface 416, sensors 420, driver circuitry 422, power management integrated circuit (PMIC) 424, antenna structure 426, and battery 428. The components of the UE 400 may be implemented as integrated circuits (ICs), portions thereof, discrete electronic devices, or other modules, logic, hardware, software, firmware, or a combination thereof. The block diagram of FIG. 4 is intended to show a high-level view of some of the components of the UE 400. However, some of the components shown may be omitted, additional components may be present, and different arrangement of the components shown may occur in other implementations.

The components of the UE 400 may be coupled with various other components over one or more interconnects 432, which may represent any type of interface, input/output, bus (local, system, or expansion), transmission line, trace, optical connection, etc. that allows various circuit components (on common or different chips or chipsets) to interact with one another.

The processors 404 may include processor circuitry such as, for example, baseband processor circuitry (BB) 404A, central processor unit circuitry (CPU) 404B, and graphics processor unit circuitry (GPU) 404C. The processors 404 may include any type of circuitry or processor circuitry that executes or otherwise operates computer-executable instructions, such as program code, software modules, or functional processes from memory/storage 412 to cause the UE 400 to perform operations as described herein.

In some embodiments, the baseband processor circuitry 404A may access a communication protocol stack 436 in the memory/storage 412 to communicate over a 3GPP compatible network. In general, the baseband processor circuitry 404A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 408.

The baseband processor circuitry 404A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 412 may include one or more non-transitory, computer-readable media that includes instructions (for example, communication protocol stack 436) that may be executed by one or more of the processors 404 to cause the UE 400 to perform various operations described herein. The memory/storage 412 include any type of volatile or non-volatile memory that may be distributed throughout the UE 400. In some embodiments, some of the memory/storage 412 may be located on the processors 404 themselves (for example, L1 and L2 cache), while other memory/storage 412 is external to the processors 404 but accessible thereto via a memory interface. The memory/storage 412 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 408 may include transceiver circuitry and radio frequency front module (RFEM) that allows the UE 400 to communicate with other devices over a radio access network. The RF interface circuitry 408 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 426 and proceed to filter and amplify (with a low-noise amplifier) the signal. The signal may be provided to a receiver of the transceiver that down-converts the RF signal into a baseband signal that is provided to the baseband processor of the processors 404.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 426. In various embodiments, the RF interface circuitry 408 may be configured to transmit/receive signals in a manner compatible with NR access technologies.

The antenna 426 may include antenna elements to convert electrical signals into radio waves to travel through the air and to convert received radio waves into electrical signals. The antenna elements may be arranged into one or more antenna panels. The antenna 426 may have antenna panels that are omnidirectional, directional, or a combination thereof to enable beamforming and multiple input, multiple output communications. The antenna 426 may include microstrip antennas, printed antennas fabricated on the surface of one or more printed circuit boards, patch antennas, phased array antennas, etc. The antenna 426 may have one or more panels designed for specific frequency bands including bands in FR1 or FR2.

The user interface circuitry 416 includes various input/output (I/O) devices designed to enable user interaction with the UE 400. The user interface 416 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 400.

The sensors 420 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lens-less apertures); light detection and ranging sensors; proximity sensors (for example, infrared radiation detector and the like); depth sensors; ambient light sensors; ultrasonic transceivers; microphones or other like audio capture devices; etc.

The driver circuitry 422 may include software and hardware elements that operate to control particular devices that are embedded in the UE 400, attached to the UE 400, or otherwise communicatively coupled with the UE 400. The driver circuitry 422 may include individual drivers allowing other components to interact with or control various input/output (I/O) devices that may be present within, or connected to, the UE 400. For example, driver circuitry 422 may include a display driver to control and allow access to a display device, a touchscreen driver to control and allow access to a touchscreen interface, sensor drivers to obtain sensor readings of sensor circuitry 420 and control and allow access to sensor circuitry 420, drivers to obtain actuator positions of electro-mechanic components or control and allow access to the electro-mechanic components, a camera driver to control and allow access to an embedded image capture device, audio drivers to control and allow access to one or more audio devices.

The PMIC 424 may manage power provided to various components of the UE 400. In particular, with respect to the processors 404, the PMIC 424 may control power-source selection, voltage scaling, battery charging, or DC-to-DC conversion.

In some embodiments, the PMIC 424 may control, or otherwise be part of, various power saving mechanisms of the UE 400. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 400 may power down for brief intervals of time and thus save power. If there is no data traffic activity for an extended period of time, then the UE 400 may transition off to an RRC_Idle state, where it disconnects from the network and does not perform operations such as channel quality feedback, handover, etc. The UE 400 goes into a very low power state, and it performs paging where again it periodically wakes up to listen to the network and then powers down again. The UE 400 may not receive data in this state; in order to receive data, it may be required to transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 428 may power the UE 400, although in some examples the UE 400 may be mounted deployed in a fixed location, and may have a power supply coupled to an electrical grid. The battery 428 may be a lithium ion battery, a metal-air battery, such as a zinc-air battery, an aluminum-air battery, a lithium-air battery, and the like. In some implementations, such as in vehicle-based applications, the battery 428 may be a typical lead-acid automotive battery.

Figure 5:
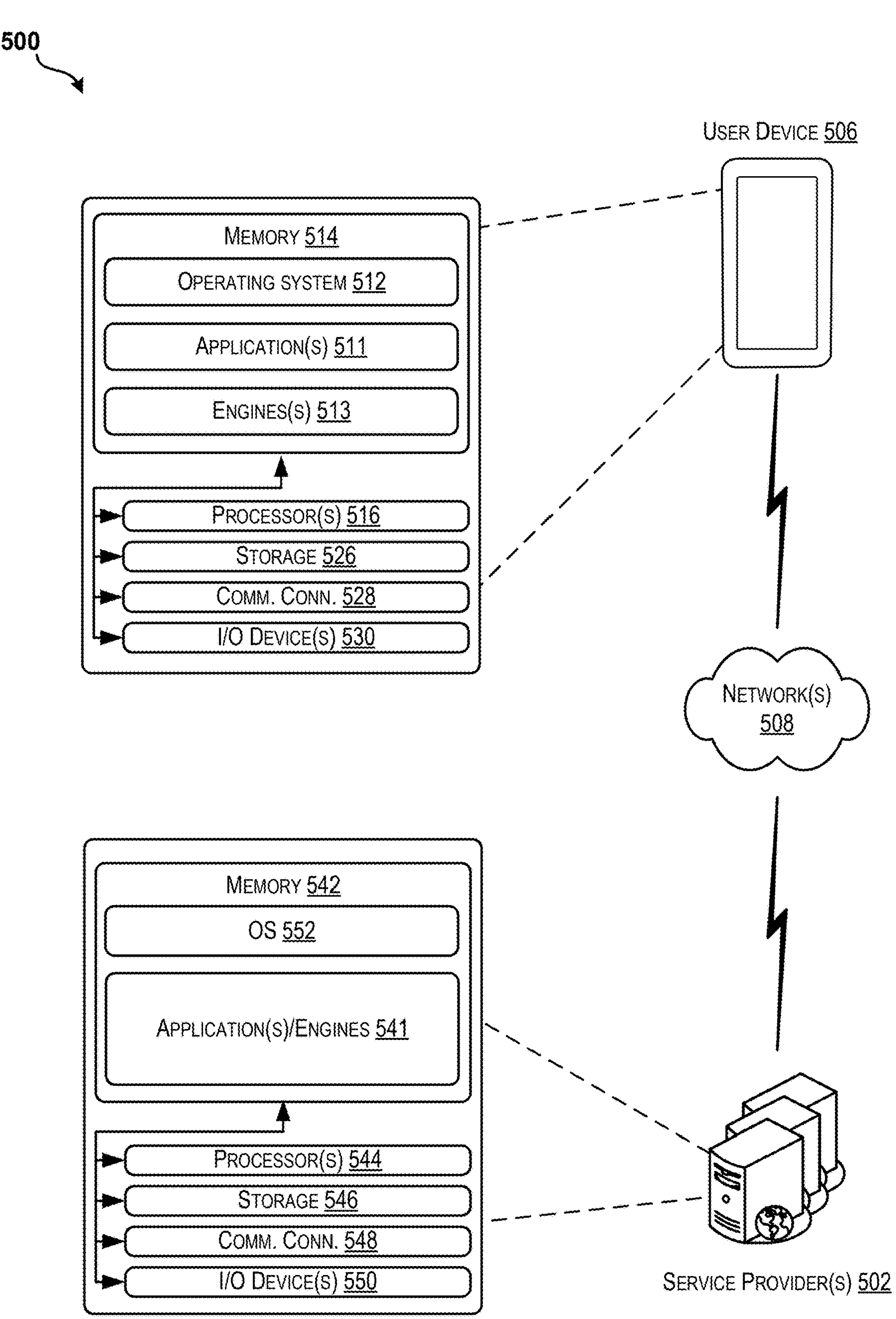
FIG. 5 illustrates an example architecture or environment configured to implement techniques described herein in accordance with some embodiments.

FIG. 5 illustrates an example architecture or environment 500 configured to implement techniques described herein in accordance with some embodiments. The architecture 500 includes a user device 506 (e.g., the user device 110) and a service provider computer 502 (e.g., the computing system 102. In some examples, the example architecture 500 may further be configured to enable the user device 506 and the service provider computer 502 to share information. In some examples, the devices may be connected via one or more networks 508 (e.g., via Bluetooth, WiFi, the Internet). In some examples, the service provider computer 502 may be configured to implement at least some of the techniques described herein with reference to the user device 506 and vice versa.

In some examples, the networks 508 may include any one or a combination of many different types of networks, such as cable networks, the Internet, wireless networks, cellular networks, satellite networks, other private and/or public networks, or any combination thereof. While the illustrated example represents the user device 506 accessing the service provider computer 502 via the networks 508, the described techniques may equally apply in instances where the user device 506 interacts with the service provider computer 502 over a landline phone, via a kiosk, or in any other manner. It is also noted that the described techniques may apply in other client/server arrangements (e.g., set-top boxes), as well as in non-client/server arrangements (e.g., locally stored applications, peer-to-peer configurations).

As noted above, the user device 506 may be any type of computing device such as, but not limited to, a mobile phone, a smartphone, a personal digital assistant (PDA), a laptop computer, a desktop computer, a thin-client device, a tablet computer, a wearable device such as a smart watch, an electronic device in a moveable vehicle or transport device, or the like. In some examples, the user device 506 may be in communication with the service provider computer 502 via the network 508, or via other network connections.

In one illustrative configuration, the user device 506 may include at least one memory 514 and one or more processing units (or processor(s)) 516. The processor(s) 516 may be implemented as appropriate in hardware, computer-executable instructions, firmware, or combinations thereof. Computer-executable instructions or firmware implementations of the processor(s) 516 may include computer-executable or machine-executable instructions written in any suitable programming language to perform the various functions described. The user device 506 may also include geo-location devices (e.g., a global positioning system (GPS) device or the like) for providing and/or recording geographic location information associated with the user device 506. In some examples, the processors 516 may include a GPU and a CPU.

The memory 514 may store program instructions that are loadable and executable on the processor(s) 516, as well as data generated during the execution of these programs. Depending on the configuration and type of the user device 506, the memory 514 may be volatile (such as random access memory (RAM)) and/or non-volatile (such as read-only memory (ROM), flash memory). The user device 506 may also include additional removable storage and/or non-removable storage 526 including, but not limited to, magnetic storage, optical disks, and/or tape storage. The disk drives and their associated non-transitory computer-readable media may provide non-volatile storage of computer-readable instructions, data structures, program modules, and other data for the computing devices. In some examples, the memory 514 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 514 and the additional storage 526, both removable and non-removable, are all examples of non-transitory computer-readable storage media. For example, non-transitory computer-readable storage media may include volatile or non-volatile, removable or non-removable media implemented in any method or technology for storage of information such as computer-readable instructions, data structures, program modules, or other data. The memory 514 and the additional storage 526 are both examples of non-transitory computer-storage media. Additional types of computer-storage media that may be present in the user device 506 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 506. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 506 may also contain communications connection(s) 528 that allow the user device 506 to communicate with a data store, another computing device or server, user terminals, and/or other devices via the network 508. The user device 506 may also include I/O device(s) 530, such as a keyboard, a mouse, a pen, a voice input device, a touch screen input device, a display, speakers, and a printer.

Turning to the contents of the memory 514 in more detail, the memory 514 may include an operating system 512 and/or one or more application programs or services for implementing the features disclosed herein such as applications 511 (e.g., map applications, web application) and map engine 513. The techniques described with respect to FIGS. 1-32 may be performed by the map engine 513.

The service provider computer 502 may also be any type of computing device such as, but not limited to, a collection of virtual or "cloud" computing resources, a remote server, a mobile phone, a smartphone, a PDA, a laptop computer, a desktop computer, a thin-client device, a tablet computer, a wearable device, a server computer, or a virtual machine instance. In some examples, the service provider computer 502 may be in communication with the user device 506 via the network 508, or via other network connections.

In one illustrative configuration, the service provider computer 502 may include at least one memory 542 and one or more processing units (or processor(s)) 544. The processor(s) 544 may be implemented as appropriate in hardware, computer-executable instructions, firmware, or combinations thereof. Computer-executable instructions or firmware implementations of the processor(s) 544 may include computer-executable or machine-executable instructions written in any suitable programming language to perform the various functions described.

The memory 542 may store program instructions that are loadable and executable on the processor(s) 544, as well as data generated during the execution of these programs. Depending on the configuration and type of service provider computer 502, the memory 542 may be volatile (such as RAM) and/or non-volatile (such as ROM and flash memory). The service provider computer 502 may also include additional removable storage and/or non-removable storage 546 including, but not limited to, magnetic storage, optical disks, and/or tape storage. The disk drives and their associated non-transitory computer-readable media may provide non-volatile storage of computer-readable instructions, data structures, program modules, and other data for the computing devices. In some examples, the memory 542 may include multiple different types of memory, such as SRAM, DRAM, or ROM. While the volatile memory described herein may be referred to as RAM, any volatile memory that would not maintain data stored therein, once unplugged from a host and/or power, would be appropriate. The memory 542 and the additional storage 546, both removable and non-removable, are both additional examples of non-transitory computer-readable storage media.

The service provider computer 502 may also contain communications connection(s) 548 that allow the service provider computer 502 to communicate with a data store, another computing device or server, user terminals, and/or other devices via the network 508. The service provider computer 502 may also include I/O device(s) 550, such as a keyboard, a mouse, a pen, a voice input device, a touch input device, a display, speakers, and a printer.

Turning to the contents of the memory 542 in more detail, the memory 542 may include an operating system 552 and/or one or more application programs 541 or services for implementing the features disclosed herein such as those described with reference to FIGS. 1-6.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

As described above, one aspect of the present technology is the gathering, sharing, and use of data, including an authentication tag and data from which the tag is derived. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which device ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, users may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

In some examples, "circuitry" can refer to, be part of, or include hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or," unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The specific details of particular embodiments may be combined in any suitable manner or varied from those shown and described herein without departing from the spirit and scope of embodiments of the described techniques.

The above description of example embodiments of the described techniques has been presented for the purposes of illustration and description. It is not intended to be exhaustive or to limit the described techniques to the precise form described, and many modifications and variations are possible in light of the teaching above. The embodiments were chosen and described in order to best explain the principles of the described techniques and its practical applications to thereby enable others skilled in the art to best utilize the described techniques in various embodiments and with various modifications as are suited to the particular use contemplated.

What is claimed is:

1. A method comprising:

generating, on a hardware security module of a computing system, a root certificate;

signing, by the computing system, an application used for secure data transfers using the root certificate;

providing, by the computing system, the application and a hash of a public key associated with a static configuration load management (SCLM) root certificate to the user device, such that the application is loaded on a secure partition of the user device and the public key is stored on the user device;

receiving, by a configuration generator of the computing system, configuration data associated with the application;

accessing, by the configuration generator of the computing system, certificate data indicating a certificate chain from a certificate service;

generating, by the configuration generator of the computing system, a configuration script based at least in part on the configuration data and including at least a portion of the certificate data in the certificate data;

generating, by the configuration generator of the computing system, a script hash based on at least a portion of the configuration script;

receiving, by the configuration generator of the computing system, a validation signature for the configuration script from the certificate service; and providing, by the computing system, the configuration script, the script hash, and the validation signature to a user device comprising the application used for secure data transfers such that the application is modified using the configuration script.

2. The method of claim 1, further comprising:

generating, by the certificate service of the computing system, a static configuration load management (SCLM) root certificate;

generating, by the certificate service of the computing system, an intermediate certificate based at least in part on the SCLM root certificate; and generating, by the certificate service of the computing system, a leaf certificate based at least in part on the intermediate certificate, the leaf certificate used for the validation signature.

3. The method of claim 1, wherein the certificate service and the configuration generator are implemented on separate servers.

4. The method of claim 1, wherein the certificate service and the configuration generator are implemented on a cloud-based architecture.

5. The method of claim 1, wherein the configuration data is received via a configuration portal.

6. The method of claim 1, wherein the user device comprises a secure partition associated with the computing system.

7. The method of claim 1, wherein the user device requests the configuration script from the computing system via one or more application programming interface (API) calls.

8. A system, comprising:

one or more processors; and a computer-readable memory comprising instructions that, when executed by the one or more processors, cause the system to perform operations to:

generate, on a hardware security module of a computing system, a root certificate;

sign, by the computing system, an application used for secure data transfers using the root certificate;

provide, by the computing system, the application and a hash of the public key associated with a static configuration load management (SCLM) root certificate to the user device, such that the application is loaded on a secure partition of the user device and the public key is stored on the user device;

receive, by a configuration generator of a computing system, configuration data associated with the application;

access, by the configuration generator of the computing system, certificate data indicating a certificate chain from a certificate service;

generate, by the configuration generator of the computing system, a configuration script based at least in part on the configuration data and including at least a portion of the certificate data in the configuration script;

generate, by the configuration generator of the computing system, a script hash based at least in part on at least a portion of the configuration script;

receive, by the configuration generator of the computing system, a validation signature for the configuration script from the certificate service, the validation signature comprising a public key; and provide, by the computing system, the configuration script with the script hash and the validation signature to a user device comprising the application used for secure data transfers such that the application is modified using the configuration script.

9. The system of claim 8, wherein the system further performs operations to:

generate, on a hardware security module of the computing system, a root certificate;

sign, on the hardware security module (HSM) of the computing system, the application using the root certificate; and provide, by the computing system, the application and a key hash of a public key associated with a static configuration load management root certificate to the user device, such that the application is loaded on a secure partition of the user device and the key hash is stored on the user device.

10. The system of claim 8, wherein the certificate service and the configuration generator are implemented on separate servers.

11. The system of claim 8, wherein the certificate service and the configuration generator are implemented on a cloud-based architecture.

12. The system of claim 8, wherein the configuration data is received via a configuration portal.

13. The system of claim 8, wherein the user device comprises a secure element associated with the computing system.

14. The system of claim 8, wherein the user device requests the configuration script from the computing system via one or more application programming interface (API) calls.

15. A non-transitory computer-readable memory comprising instructions that, when executed by one or more processors, cause the one or more processors to perform operations comprising:

generating, on a hardware security module of a computing system, a root certificate;

signing, by the computing system, an application used for secure data transfers using the root certificate;

providing, by the computing system, the application and a hash of a public key associated with a static configuration load management (SCLM) root certificate to the user device, such that the application is loaded on a secure partition of the user device and the public key is stored on the user device;

receiving, by a configuration generator of the computing system, configuration data associated with the application;

accessing, by the configuration generator of the computing system, certificate data indicating a certificate chain from a certificate service;

generating, by the configuration generator of the computing system, a configuration script based at least in part on the configuration data and including at least a portion of the certificate data in the configuration script;

generating, by the configuration generator of the computing system, a script hash based at least in part on at least a portion of the configuration script;

receiving, by the configuration generator of the computing system, a validation signature for the configuration script from the certificate service; and providing, by the computing system, the configuration script with the script hash and the validation signature to a user device comprising the application used for secure data transfers such that the application is modified using the configuration script.

16. The non-transitory computer-readable memory of claim 15, wherein the certificate service and the configuration generator are implemented on separate servers.

17. The non-transitory computer-readable memory of claim 15, wherein the certificate service and the configuration generator are implemented on a cloud-based architecture.

18. The non-transitory computer-readable memory of claim 15, wherein the configuration data is received via a configuration portal.

19. The non-transitory computer-readable memory of claim 15, wherein the user device comprises a secure partition associated with the computing system.

* * * * *